United States Patent [19]

Malcuit et al.

[11] Patent Number: 5,706,383
[45] Date of Patent: Jan. 6, 1998

[54] ACTIVE NOISE SUPPRESSOR FOR MULTICHANNEL OPTICAL SYSTEMS

[75] Inventors: Michelle S. Malcuit; Thomas W. Stone; Jeffrey A. Kleinfeld, all of Bethlehem, Pa.

[73] Assignee: Wavefront Research, Inc., Bethlehem, Pa.

[21] Appl. No.: 641,195

[22] Filed: Apr. 30, 1996

[51] Int. Cl.$^6$ .................................... G02B 6/10
[52] U.S. Cl. ................ 385/131; 385/18; 385/132; 257/432
[58] Field of Search ................ 385/131, 129, 385/130, 132, 16, 17, 18; 257/432, 437, 429

[56] References Cited

PUBLICATIONS

M. Ikeda, "Laser Diode Switch," Electronics Letters 17, 899 (1981), No month.
E. Spitz, D. Dolfi, and J-P. Huignard, "Microwave Beam Forming by Optical Delay Switching," Proceedings of the SPIE, 1807, 422(1992), No. month.
R. Raj, J. A. Levenson, J. L. Oudar, and M. Bensoussan, "Vertical Microcavity Optical Amplifying Switch," Electronics Letters 29, 167 (1993), Jan.
R. Raj, J. L. Oudar, and M. Bensoussan, "Vertical Cavity Amplifying Photonic Switch," Applied Physics Letters 65, 2359 (1994), Oct.
C. Tombling, T. Saitoh, and T. Mukai, "Performance Predictions for Vertical-Cavity Semiconductor Laser Amplifiers," IEEE Journal of Quantum Electronics 30, 2491 (1994), No month.
S. F. Lim and C. J. Chang-Hasnain, "A Proposal of Broad-Bandwidth Vertical-Cavity Laser Amplifier," IEEE Photonics Technology Letters 7, 1240 (1995), Nov.
N. A. Riza, "Polarization-Based Fiber-Optic Delay Lines," Proceedings of the SPIE, 2560, 120 (1995), No month.

Primary Examiner—Phan T. H. Palmer
Attorney, Agent, or Firm—Jacob N. Erlich; Jerry Cohen

[57] ABSTRACT

A vertical cavity signal suppressor array having a plurality of suppressor elements, each of which incorporate therein an active semiconductor region bounded by reflective elements and a source of current 20 connected thereto. When in operation within a multichannel optical system a preselected signal suppressing element the signal suppressor array is turned "on" in the selected channel of interest. This is accomplished by either injecting a small current through the reflective elements or by optical pumping, and the desired signal channel is transmitted with little or no loss. All the non-selected channels remain undriven or "off", that is, a state in which they are strongly absorptive.

13 Claims, 5 Drawing Sheets

ACTIVE NOISE SUPPRESSOR FOR MULTICHANNEL OPTICAL SYSTEMS

STATEMENT OF GOVERNMENT INTEREST

This invention was made with Government support under F30602-95-C-0238 awarded by the U.S. Air Force. The Government has certain rights in the invention.

FIELD OF THE INVENTION

The present invention relates generally to signal suppressors, and, more particularly, to active noise or signal suppressors which enhance channel isolation in optical systems containing numerous channels.

BACKGROUND OF THE INVENTION

Optoelectronic systems in which modulated carrier beams are switched among many parallel channels to introduce controlled time delays, or to spatially route or steer the beams, are increasingly being applied to solve challenging problems. For example, free space photonic time shifters such as described in U.S. patent application Ser. No. 08/640,187 entitled "Optical Time Shifter and Routing System" filed herewith and fiber-based switched delay lines can be used in digital time delay modules for true time delay control of phased arrays, thus eliminating the beam squint problem at large modulation bandwidths while offering more compact, lightweight, and low cost performance than their microwave counterparts. Similarly, digitally modulated carriers can be routed to implement optical interconnects that permit active reconfiguration. These and other related systems rely on the fast, high contrast switching of optical signals between multiple parallel channels.

The ultimate performance of the multichannel optical systems described above, in which one of many paths is selected at a time, is limited by crosstalk or leakage of light between the desired channel and the non-selected channels. Major sources of this noise or crosstalk include imperfect switching purity, scatter, spurious beams, and reflections. For the case of phased array photonic time shifters, crosstalk increases insertion loss and results in the presence of superposed signals with erroneous delays. Together, these effects create unwanted lobes in the array pattern, cause amplitude and phase distortions in the desired signal, and increase the subsequently required gain and associated nonlinearities.

While system performance is typically limited by noise and crosstalk, reducing the mechanisms that contribute to crosstalk is difficult and usually imposes constraints that limit manufacturability and increase costs. For example, deviations from perfect optoelectronic switch purity result in signal leakage to non-selected channels. But the amount of engineering and corresponding tightening of manufacturing tolerances that are required to increase switch purity, for example from 99% to 99.9%, is disproportionate and as costs rise, a diminishing return is achieved. This factor, coupled with system requirements for crosstalk levels that are 30 to 50 dB or more below signal levels, underscores the need for a new approach to crosstalk suppression.

It is therefore an object of this invention to provide an active signal suppressor that effects optimal suppression of crosstalk resulting from imperfect switching purity, scatter, spurious beams and reflections in parallel optical systems.

It is another object of this invention to provide an active signal suppressor which greatly relaxes focusing and alignment tolerances and reduces coupling losses when compared to waveguide (edge emmitting) geometries.

It is another object of this invention to provide an active signal suppressor which is insensitive to the polarization state of an optical signal.

SUMMARY OF THE INVENTION

The present invention overcomes the problems set forth above. More specifically, the vertical cavity signal suppressor array of the present invention is made up of a plurality of actively controlled semiconductor devices designed to simultaneously suppress the transmission of undesired or spurious signals through an optical system, while maximizing the transmission of any selected signals. Stated more succinctly, the invention includes an array of one or more individually addressable micro-optic suppression elements which match the array of parallel optical channels of a host optical system, and serve to either attenuate or transmit signal light (electromagnetic radiation) depending on the state of injection current pumping or optical pumping in each element. Individual element control therefore allows a spurious signal in one channel to be significantly attenuated by one element, while a desired signal in a neighboring channel may be simultaneously transmitted with little or no loss by another element. Similarly, a single element may regulate the temporal transmission of a desired signal in a single channel depending on its control state.

Each element in the array is fabricated from semiconductor material with absorption properties tailored to the desired optical wavelength of the overall system, such as indium gallium arsenide phosphide or indium gallium arsenide. The elements are grown to a suitable thickness, which, for the case of example, may be on the order of a few microns, with reflectors located at the top and bottom which define the "vertical" cavity. Current confining techniques such as proton implantation or reactive ion etching are then used to limit the lateral extent of the element. Signal light is directed into each element normal to the plane of crystal growth, as is injection current in the case of current pumping.

The physical principles underlying the device operation include the large band edge absorption feature (including all contributing features, such as exciton resonances and band tail states) of the semiconductor material, and the ability to alter this absorption through either electrical current injection pumping or optical pumping. Such pumping can render the material transparent to impinging light which would otherwise be highly attenuated. The absorption, or even gain depending on pumping state, is then enhanced by the Fabry-Perot cavity effects produced by the reflectors. Additionally, the cavity resonances are at different frequencies in pumped and unpumped states, due to the refractive index shift caused by the presence of extra carriers in the active region. This shift provides additional discrimination between transmitting and absorbing element states, enhancing the contrast afforded by the device.

For a better understanding of the present invention, together with other and further objects, reference is made to the following description taken in conjunction with the accompanying drawings, and its scope will be pointed out in the appended claims.

DETAILED DESCRIPTION OF THE PREFERRED EMBODIMENTS

Figure 1:
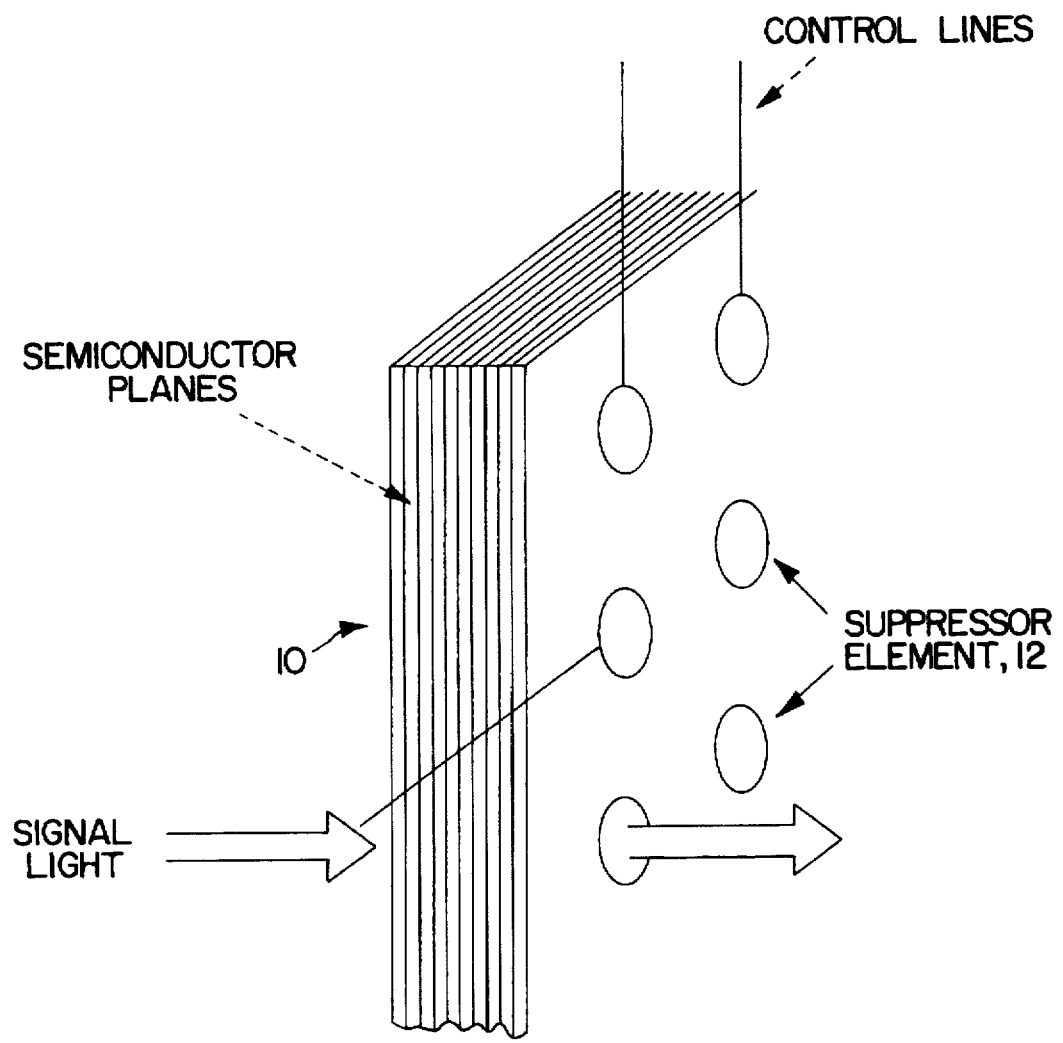
FIG. 1 is a schematic pictorial representation of the signal suppressor array of the present invention.
Figure 2:
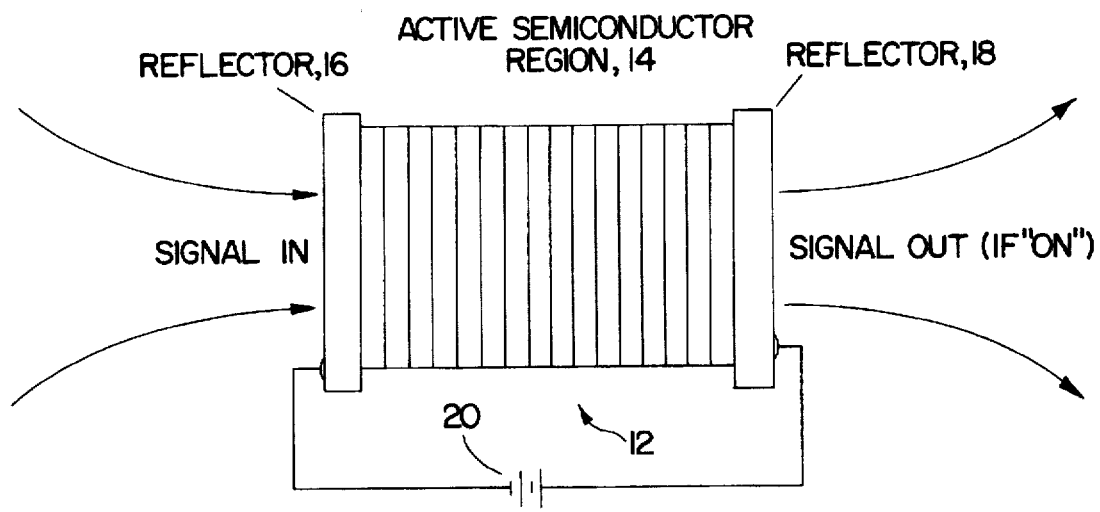
FIG. 2 is a schematic representation of the signal suppressor element of the present invention.

Reference is now made to FIG. 1 of the drawings which shows a segment of the vertical cavity signal suppressor array 10 of this invention. While the specific construction or operation of certain components may vary in implementation, the feature common to devices of this invention is one or more vertical cavity signal suppressor elements 12 as shown in FIG. 2 arranged in an array. These elements are typically fabricated by epitaxial growth on a common wafer substrate, with spacing dependent on the requirements of the host optical system. The planar extent and location of each element 12 is then defined by proton implanation, reactive ion etching, or any other current confining technique appropriate for the semiconductor used to construct the device.

Signal light is directed into the array 10 normal to the planes of crystal growth as shown. The state of each signal suppressor element ("on" or "off") may be controlled by either optical pumping or injection current pumping. In the case of an array operated by injection current pumping, each element is connected to an electrode and subsequently to one or more addressable control lines as shown which regulate the flow of electrical current to the element 12.

Each of the suppressor elements 12 are fabricated from semiconductor material and match the number of parallel optical channels of a multichannel optical device such as an optical time shifter or routing system of the types described in U.S. patent application Ser. No. 08/640,187 entitled "Optical Time Shifter and Routing System" one such system being shown schematically in FIG. 3 of the drawings.

Figure 3:
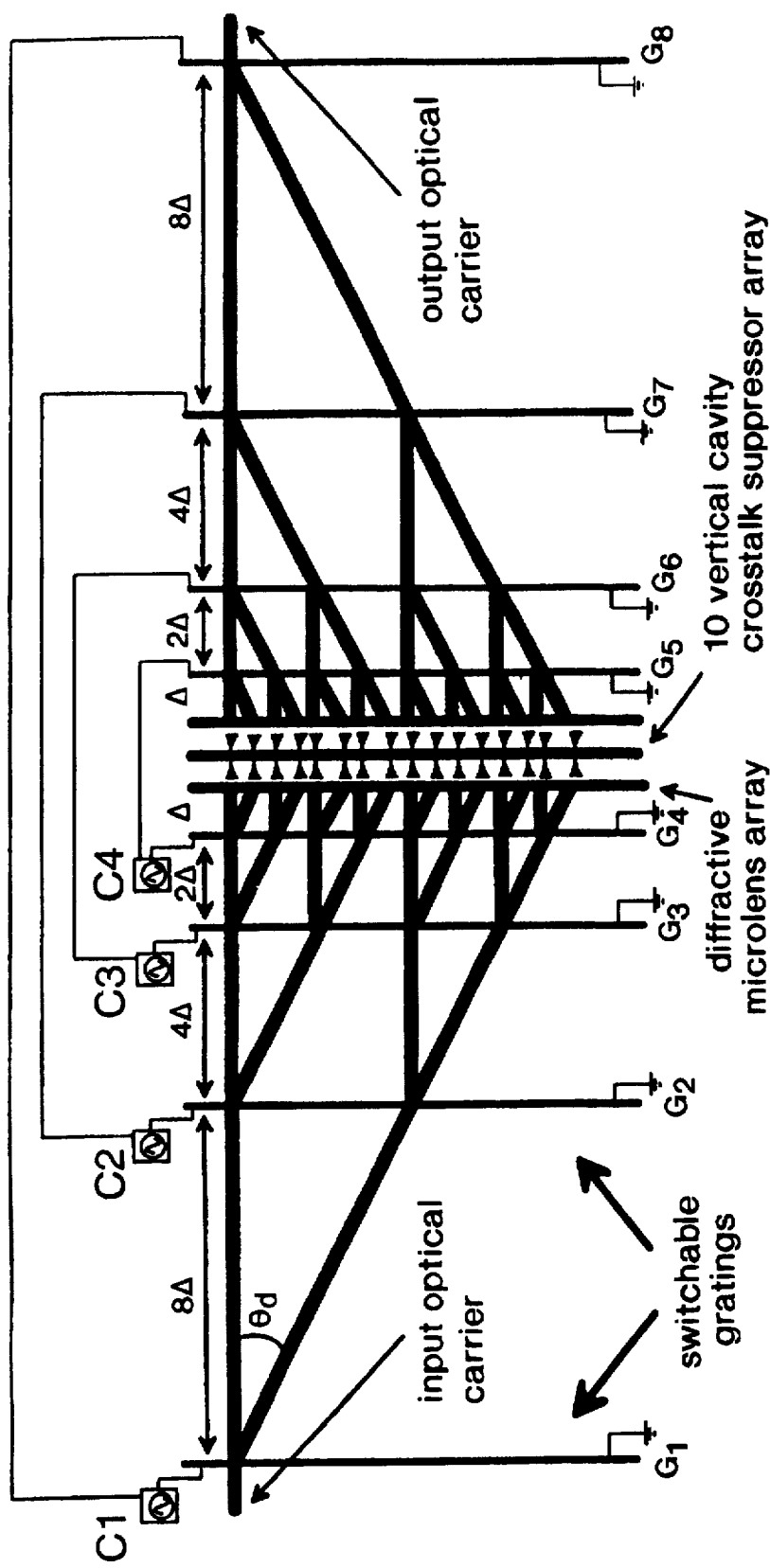
FIG. 3 is a schematic representation of a multichannel optical system incorporating the signal suppressor array of the present invention therein.

The details of suppressor element 12 will be described in greater detail below, however, as shown in FIG. 2, generally each suppressor element 12 incorporates therein an active semiconductor region 14 bounded by reflective elements 16 and 18 with a source of current 20 connected thereto for the case of electrical current injection pumping. For the case of optical pumping, the source of current 20 is not required. When in operation within an optical system as shown in FIG. 3 only the signal suppressing element 12 of the signal suppressor array 10 of this invention is turned "on" in the selected channel of interest. This is accomplished by either injecting a small current through the reflective elements 16 and 18 (normal to the plane of crystal growth) or by optical pumping, and the desired signal channel is transmitted with little or no loss. All the non-selected channels remain undriven or "off", that is, a state in which they are strongly absorptive. Thus, spurious and crosstalk signals that are present in the non-selected channels are heavily attenuated. Reflectors 16 and 18 serve to enhance either the gain or attenuation of the incoming beam of electromagnetic radiation by multiple passing it through the semiconductor region 14. As will be pointed out later in this description, it may even be possible, under certain circumstances, to eliminate the use of reflective elements 16 and 18. The vertical cavity geometry permits the cost effective fabrication of dense arrays compatible with parallel optical channels, and since only the few desired channels are powered, thermal loading does not restrict the signal suppressor array 10 or channel density.

The significance of the active vertical cavity signal suppressor array 10 of this invention lies in the fact that it is a device that, when in a switched parallel optical system, enhances the contrast between selected and non-selected channels for example by an additional 35 dB over the level of contrast or channel isolation that the parallel system alone exhibited. The large added contrast afforded by this active suppressor array may be used entirely to add to the overall channel contrast in a multichannel optical system, or some of the added contrast may be used to relax the tolerances on the devices in the host system, thereby lowering cost or improving overall manufacturability.

There has been some recent theoretical interest in constructing vertical cavity semiconductor laser amplifiers as exemplified by the following publications—C. Tombling, et al., "Performance Predictions for Vertical-Cavity Semiconductor Laser Amplifiers," IEEE J. Quant. Elect. 30, 2491 (1994) and S. F. Lim, et al., "A Proposal of Broad-Bandwidth Vertical-Cavity Laser Amplifier," IEEE Phot. Tech. Lett. 7, 1240 (1995). The present invention addresses the challenges posed by the need for crosstalk suppression in parallel optical systems. The vertical cavity signal suppressor array 10 of this invention is unique since it is the contrast between "on" and "off" states that must be maximized, and not necessarily the output power. Another unique aspect of the suppressor array 10 is that, as opposed to the Saturable Absorber Noise Suppressor described in U.S. patent application Ser. No. 08/640,187 entitled 'Optical Time Shifting and Routing System', it may also be used to provide modest gain in the desired channel to overcome or relax constraints on other system losses. Such a device is extremely well suited to two-dimensional system integration, and is readily introduced into a host optical system with little or no insertion loss. With physical dimensions on the order of microns, the present invention is highly adaptable for use in micro-optical architectures. Large spherically symmetric apertures greatly relax focusing and alignment tolerances and reduce coupling losses when compared with other (waveguide) geometries such as those associated with conventional semiconductor laser optical amplifiers. When combined with size considerations and the easy integration of the suppressor array 10 into two-dimensional arrays, suppressor array 10 offers tremendous advantages over conventional semiconductor laser optical amplifiers. A further advantage of the vertical cavity structure is an insensitivity to the polarization state of the optical signal.

The parameters important to the operation of the vertical cavity suppressor element 12 of this invention include the active semiconductor region thickness, cavity mirror reflectivity, and injected current density. In contrast to standard p-n junction laser diodes or optical amplifiers, vertical cavity semiconductor devices are designed to operate with the direction of propagation of light normal to the plane of crystal growth. This presents several distinct advantages when compared to edge emitting devices. These advantages include a much larger and circularly symmetric input/output aperture facilitating easier light coupling with lower losses, polarization independent operation, and simple integration into large two-dimensional arrays.

A vertical cavity surface emitting laser (VCSEL) is an example of a vertical cavity semiconductor device, however its geometry, although at first glance similar to the vertical cavity signal suppressor element 10 of this invention, is actually substantially different. For example the length of the VCSEL is typically around 5 microns, with a cylindrical cavity of diameter on the order of 2 microns. The active region thickness for a VCSEL is typically on the order of 0.1 microns. Since this implies a fairly small single pass gain for light in the cavity, cavity mirrors with high reflectivities must be used for lasing to take place. The mirrors are usually constructed from alternating layers of varying index semiconductor material known as distributed Bragg reflectors (DBR's). Electrical current is then pumped through the mirrors, and laser light is emitted from the top and bottom of the structure (provided the substrate non-absorbing). The active region of a VCSEL is kept quite short in order to lower the injection current density required for laser operation.

In contrast thereto, the vertical cavity signal suppressor element of the present invention as shown in FIG. 2 of the drawings has the following configuration. The active region 14 may be composed of either bulk or quantum well semiconductor material, chosen such that its optical properties are appropriate for the system in which it is to be employed. This material then provides either attenuation, transmission or even gain of the signal beam, depending on the control state of the element. In contrast to a VCSEL, this active region may constitute a significant portion or all of the overall cavity (as defined by the reflectors), depending on the spectral requirements of the host system. Appropriate current confining techniques such as proton implantation or reactive ion etching serve to define the lateral extent of the element.

The reflectors 16, 18 located on either end of the element serve to multiple pass the signal through the active region, enhancing the contrast provided by the device, and may be constructed from Distributed Bragg Reflectors, dielectric stacks, or metals, among other materials. In contrast to a VESEL, the reflectivities of these mirrors may be, for the case of example, 99% or less. Signal light is then directed through the element normal to the plane of crystal growth, as is injection current in the case of electrical current pumping operation.

Figure 4:
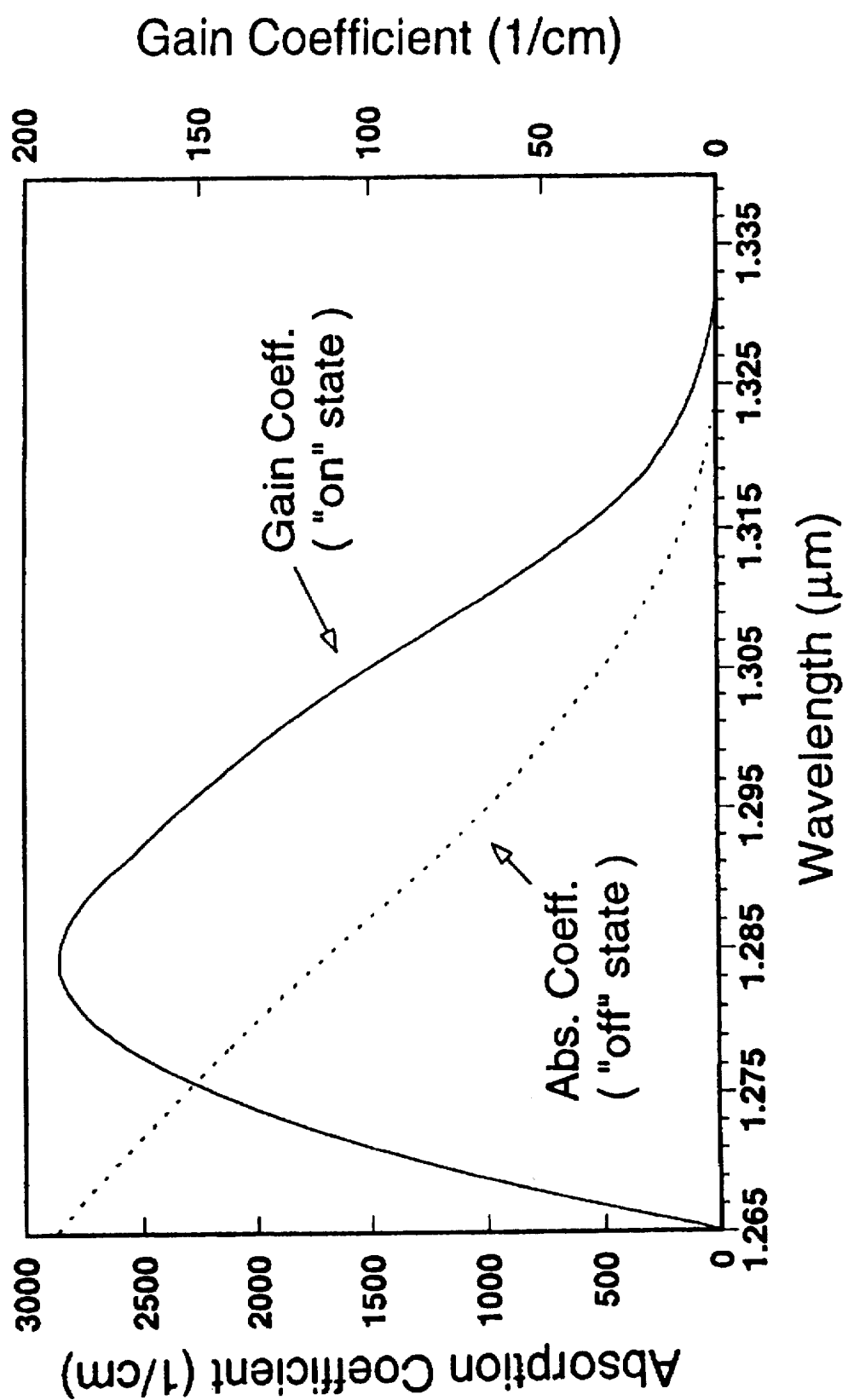
FIG. 4 is a graphic representation of the measured absorption and gain coefficients in a single $In_{0.74}Ga_{0.26}As_{0.6}P_{0.4}$/InP double heterostructure in the absence and presence of injected carriers.

FIG. 4 of the drawings shows experimental results of absorption and gain coefficient measurements in a single $In_{0.74}Ga_{0.26}As_{0.6}P_{0.4}/InP$ double heterostructure edge emitting device in the absence and presence of injected carriers, respectively. The significant overlap of the spectral regions of absorption and gain shown here demonstrates the potential using such devices in switching and noise suppression applications.

Since the active region of vertical cavity devices is typically short to minimize required injection current densities, it is usually desireable for signal light to make multiple passes through the active region to maximize the benefits of gain or absorption provided by the semiconductor. The signal suppressor element, therefore benefits from placing the active material inside a cavity and operating the signal suppressor 12 similar to a Fabry-Perot (as opposed to a traveling wave) optical amplifier.

Operating the present invention in the Fabry-Perot mode introduces unique characteristics and opportunities for the suppressor 12 of this invention. The total transmission gain provided by such a structure is given by $$G(\lambda)=g\{1-R\}^2/\{[1-gR]^2+4gR \sin^2(2\pi n l/\lambda)\}$$

where is the single pass gain(absorption) through the active region, R is the reflectivity of the front and back mirrors 14 and 16 (assumed to be the same for simplicity), n is the index of refraction of the semiconductor region 14, and $\lambda$ is the wavelength of light incident on device and l is the length of the cavity. The spectral response of the suppressor 12 is determined by the $\sin^2(\ )$ term in the denominator, and exhibits peaks for integer values of the quantity $2nl\lambda$. This expression highlights an important effect that must be considered with the cavity: a variation in the index of refraction can shift the spectral response of the suppressor.

Semiconductors are dispersive media, with wavelength dependent indices of refraction that vary from one crystal to another, depending on the elemental composition of the solid. Furthermore, since the index of refraction and absorption coefficient of a semiconductor is related through the Kramers-Kronig relations, a change in the absorption, such as induced by the presence of injected carriers, can also be expected to effect the refractive index of the material. It is anticipated that the index shift, $\Delta n$, for the sample shown in FIG. 4 is of the order of $-0.05$ or larger when switching between the "off" and "on" states. An index shift of this magnitude will have a profound effect on the transmission characteristics of suppressor element 12, shifting the cavity resonance frequency in "on" and "off" states, and therefore enhancing the device performance.

The effectiveness of the suppressor 12 in an optical system depends on the discrimination it provides between its on and off states. This can also be determined with the use of the above-mentioned formula defining transmission gain.

Figure 5:
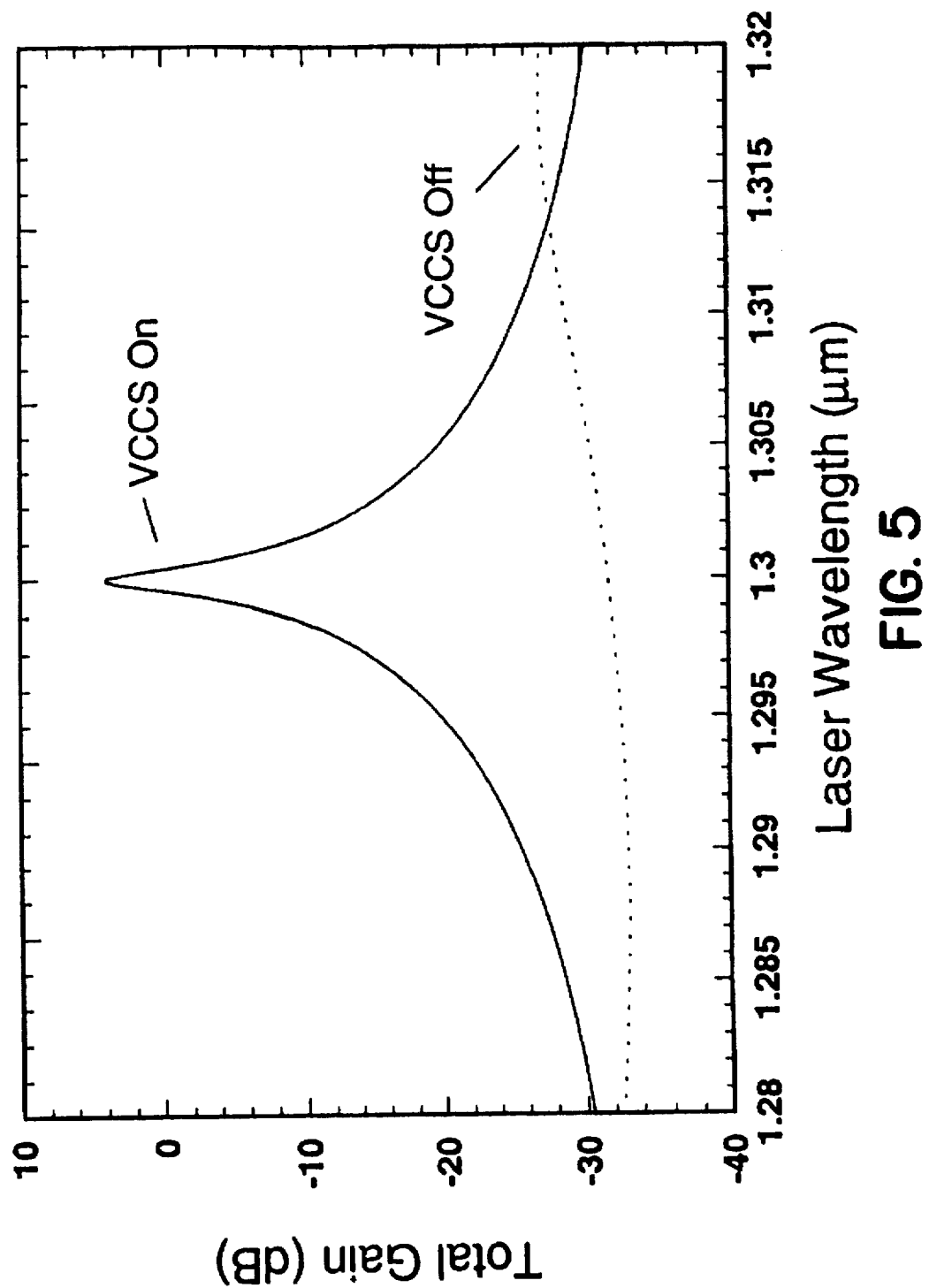
FIG. 5 is a graphic representation of the transmission characteristics of a preliminary design of this invention.

FIG. 5 illustrates the anticipated performance of an example of suppressor element 12, using device parameters of a system designed to operate near 1.3 microns that is optimized with respect to signal distortion. The active region 14 is assumed to be 3.9 microns thick, the mirror 16/18 reflectivity is assumed to be 95%, $\alpha abs=2700$ cm$^{-1}$, $\alpha gain=50$ cm$^{-1}$, and the index shift is $|\Delta n|=0.05$. The mirror reflectivities have been chosen to decrease the finesse of the optical cavity so that the distortion of the transmitted modulated carrier signal is minimized. This distortion can also be determined by the spectral response given by the above formula. For a high finesse cavity with very sharp transmission peaks, the variation of gain produced on the sidebands can be significant. For the parameters given above, the on/off discrimination is $-36$ dB, and the difference in gain at the signal maximum and 10 GHz away from resonance is only $-0.2$ dB.

The successful integration of the vertical cavity signal suppressor array 10 into an optical system, particularly one such as the phased array optical control module, requires that the noise introduced by the suppressor elements 12 of the array 10 into the system be minimized. The noise figure of the suppressor element 12, defined as $SNR_{in}/SNR_{out}$ (where SNR is the signal-to-noise ratio) is therefore an extremely important characteristic of the array. Studies of noise in conventional semiconductor optical amplifiers have shown that the dominant source of noise in such systems is a beating between the signal light and spontaneous emission (ASE). The deleterious effects of ASE can also be enhanced by cavity resonance effects. It is important to note, though, that the suppressor element 12 is not intended to be a conventional optical amplifier, but rather a device which provides large discrimination between its on and off states. It is therefore expected that when operated in the low gain regime (i.e. low current densities), signal contrast can still be maintained, while ASE can be largely diminished. Additionally, incorporating filters in conjunction with array 10 can be expected to greatly diminish noise effects due to beating of ASE.

A unique opportunity exists to exploit the distinct nature of the optimized suppressor array in reducing the amplifier noise it might introduce, particularly if used to provide gain in the selected channel. This opportunity arises since in the actual use of the suppressor array 10 of this invention, the peak of the semiconductor gain curve is specifically chosen to be removed from the optical carrier or signal wavelength, and hence the cavity resonance. This stands in contrast with other semiconductor devices, where they are naturally nearly coincident. For example, in the case considered above, there is a 30 nm separation between the signal wavelength and the gain peak. Since the amplified spontaneous emission (ASE) energy follows the gain curve, it should be possible to naturally filter or use a cutoff or notch filter to isolate the signal from the bulk of the ASE background—and, since the beating of the signal and ASE are the primary amplifier noise sources, this may be an effective mechanism for lower amplification noise.

Although the invention has been described with reference to particular embodiments, it will be understood that this invention is also capable of further and other embodiments within the spirit and scope of the appended claims.

What is claimed is:

1. A multichannel optical system comprising:

means for providing a plurality of optical paths;

means for providing a beam of electromagnetic radiation; said beam of electromagnetic radiation being directed through a preselected one of said optical paths and having substantially all of said electromagnetic radiation being output therefrom, with the other said optical paths having substantially lesser amounts of said electromagnetic radiation being output therefrom;

means for suppressing a signal, optically aligned with said plurality of optical paths, permitting said beam of electromagnetic radiation output from said preselected optical path to pass therethrough and preventing said substantially lesser amounts of electromagnetic radiation from passing therethrough; and said signal suppressing means comprising a plurality of vertical cavity semiconductor signal suppressor elements.

2. A multichannel optical system as defined in claim 1 wherein each of said vertical cavity semiconductor signal suppressor elements comprises:

an active semiconductor region containing a semiconductor material; and said active semiconductor region being bounded at each end thereof by a pair of reflective elements, said reflective elements being insufficiently reflective to permit lasing to occur within said semiconductor region.

3. A multichannel optical system as defined in claim 2 wherein each of said semiconductor signal suppressor elements permit the passage of said beam of electromagnetic radiation therethrough upon the injection of current through said reflective elements.

4. A multichannel optical system as defined in claim 2 wherein each of said semiconductor signal suppressor elements permit the passage of said beam of electromagnetic radiation therethrough upon the optical pumping of said semiconductor region.

5. A mutichannel optical system as defined in claim 2 wherein said semiconductor material encompasses substantially all of said semiconductor region.

6. A multichannel optical system as defined in claim 2 wherein each of said vertical cavity semiconductor signal suppressor elements operate in the Fabry-Perot mode in which transmission gain is defined by the following formula:

$$G(\lambda)=g[1-R]^2/\{[1-gR]^2+4gR\sin^2(2\pi n l/\lambda)\}$$

where $g_{on(off)}$=the single pass gain (absorption) through the active semiconductor region;

R=the reflectivity of the reflective elements;

n=the index of refraction of the semiconductor material in the semiconductor region;

$\lambda$=the wavelength of the beam of electromagnetic radiation; and l=the length of the cavity.

7. A mutichannel optical system as defined in claim 2 wherein each of said reflective elements have a reflectivity of substantially 95% or less.

8. A mutichannel optical system as defined in claim 2 wherein said semiconductor region is approximately 4 microns in thickness.

9. A multichannel optical system as defined in claim 1 wherein each of said vertical cavity semiconductor signal suppressor elements comprises a vertical cavity active semiconductor region containing a semiconductor material.

10. A multichannel optical system as defined in claim 9 wherein each of said semiconductor signal suppressor elements permit the passage of said beam of electromagnetic radiation therethrough upon the injection of current through said active semiconductor region.

11. A multichannel optical system as defined in claim 9 wherein each of said semiconductor signal suppressor elements permit the passage of said beam of electromagnetic radiation therethrough upon the injection of current through said active semiconductor region.

12. A multichannel optical system as defined in claim 9 wherein said active semiconductor region is substantially greater than 2 microns in thickness.

13. A multichannel optical system as defined in claim 1 wherein said signal suppressing means is operated in a low-gain limit regime.

* * * * *